United States Patent
Grolleman et al.

(10) Patent No.: US 12,311,625 B2
(45) Date of Patent: May 27, 2025

(54) DUAL TIRE COMPONENT SERVICER AND METHOD FOR SUPPLYING DUAL TIRE COMPONENTS TO A TIRE BUILDING DRUM

(71) Applicant: VMI Holland B.V., Epe (NL)

(72) Inventors: Hendrik Jan Grolleman, Epe (NL); Hans De Boer, Epe (NL)

(73) Assignee: VMI HOLLAND B.V., Epe (NL)

( * ) Notice: Subject to any disclaimer, the term of this patent is extended or adjusted under 35 U.S.C. 154(b) by 0 days.

(21) Appl. No.: 18/571,160

(22) PCT Filed: Jun. 29, 2022

(86) PCT No.: PCT/NL2022/050368
§ 371 (c)(1),
(2) Date: Dec. 15, 2023

(87) PCT Pub. No.: WO2023/003456
PCT Pub. Date: Jan. 26, 2023

(65) Prior Publication Data
US 2024/0308163 A1    Sep. 19, 2024

(30) Foreign Application Priority Data

Jul. 23, 2021    (NL) ......................................... 2028821
Mar. 29, 2022    (NL) ......................................... 2031427

(51) Int. Cl.
*B29D 30/30*    (2006.01)
(52) U.S. Cl.
CPC ..... *B29D 30/3007* (2013.01); *B29D 30/3042* (2013.01)
(58) Field of Classification Search
CPC ................ B29D 30/16; B29D 30/1607; B29D 30/1642; B29D 30/30; B29D 30/3007;
(Continued)

(56) References Cited

U.S. PATENT DOCUMENTS 4,409,872 A * 10/1983 Bertoldo ............ B29D 30/3007
271/93
4,596,617 A * 6/1986 Ishii .................... B29D 30/3007
156/134
(Continued)

FOREIGN PATENT DOCUMENTS

DE    102006017882    10/2007    ............. B29D 30/30
DE    102008021042    10/2009    ............. B29D 30/20
(Continued)

OTHER PUBLICATIONS

Albers O, EP-3495131-A1, machine translation. (Year: 2019).*
(Continued)

*Primary Examiner* — Sedef E Paquette
(74) *Attorney, Agent, or Firm* — HAYES SOLOWAY P.C.

(57) ABSTRACT

Disclosed is a dual tire component servicer and a method for supplying a first tire component and a second tire component to a tire building drum, wherein the dual tire component servicer includes a first conveyor and a second conveyor for conveying the first tire component and the second tire component, respectively, in a supply direction towards the tire building drum. The dual tire component servicer further includes a first pick-and-place unit and a second pick-and-place unit for transferring the first tire component and the second tire component, respectively, from their respective conveyors to the tire building drum. The first pick-and-place unit and the second pick-and-place unit are automatically and independently movable relative to each other in a lateral direction perpendicular to the supply direction.

29 Claims, 10 Drawing Sheets

(58) Field of Classification Search
CPC ........ B29D 30/3042; B29D 2030/4468; B29D 2030/4475; B29D 2030/4481; B29D 2030/4487; B29D 2030/4493
USPC ...................................................... 156/110.1
See application file for complete search history.

(56) References Cited

U.S. PATENT DOCUMENTS

| | | | |
|---|---|---|---|
| 6,355,126 B1 | 3/2002 | Ogawa .................... | B29D 30/38 |
| 6,488,193 B1 * | 12/2002 | Eckman ............. | B65G 21/2072 |
| | | | 226/188 |
| 2009/0188606 A1 | 7/2009 | Takatsuka et al. ............ | 156/111 |
| 2009/0260744 A1 | 10/2009 | Bobinger et al. .............. | 156/117 |
| 2015/0328853 A1 * | 11/2015 | Denavit ............. | B29D 30/0016 |
| | | | 156/394.1 |
| 2017/0144397 A1 * | 5/2017 | Shimuta ............. | B29D 30/3007 |
| 2017/0320283 A1 | 11/2017 | Marchini et al. ...... | B29D 30/30 |
| 2018/0029250 A1 | 2/2018 | Kellij et al. ........... | B29C 31/085 |
| 2018/0243933 A1 | 8/2018 | Marabito ............. | B29D 7/0625 |
| 2022/0203641 A1 | 6/2022 | Kondo et al. ...... | B29D 30/3007 |
| 2022/0212429 A1 | 7/2022 | Kondo et al. .......... | B29D 30/30 |

FOREIGN PATENT DOCUMENTS

| | | | |
|---|---|---|---|
| EP | 0288609 | 12/1987 | ............. B65H 77/00 |
| EP | 0956940 | 11/1999 | ............. B29D 30/16 |
| EP | 3495131 A1 * | 6/2019 | ............. B29D 30/26 |
| JP | 4315476 | 5/2009 | ............. B29D 30/16 |
| JP | 2009533246 | 9/2009 | ............. B29D 30/26 |
| JP | 2014500165 | 1/2014 | ............. B29D 30/06 |
| JP | 2018505082 | 2/2018 | ............. B29D 30/06 |
| JP | 2018507799 | 3/2018 | ............. B29D 30/54 |
| JP | 2020203425 | 12/2020 | |
| JP | 2020203426 | 12/2020 | |
| WO | 2007086142 | 8/2007 | ............. B29D 30/30 |
| WO | 2020255555 | 12/2020 | ............. B29D 30/30 |
| WO | 2020255556 | 12/2020 | ............. B29D 30/30 |

OTHER PUBLICATIONS

Notice of Allowance issued in Korean Application No. 10-2024-7005915, dated Aug. 19, 2024, with machine translation, 3 pgs.
Decision to Grant issued in Japanese Patent Appln. Serial No. 2022-562525, dated Mar. 26, 2024, with machine English translation, 5 pages.
Novelty Search issued in Netherlands Patent Appln. Serial No. 2028821, dated Nov. 20, 2021, 10 pages.
International Search Report and Written Opinion issued in PCT/NL2022/050368, dated Sep. 9, 2022, 10 pages.
Office Action issued in Japanese Patent Appln. Serial No. 2022-562525, dated Jan. 9, 2024, with machine English translation, 6 pages.

* cited by examiner

DUAL TIRE COMPONENT SERVICER AND METHOD FOR SUPPLYING DUAL TIRE COMPONENTS TO A TIRE BUILDING DRUM

BACKGROUND

The invention relates to a dual tire component servicer and a method for supplying dual tire components to a tire building drum.

A known dual tire component servicer for supply breaker cushions to a tire building drum comprises two conveyors for simultaneously conveying two breaker cushions in a supply direction towards the tire building drum and two pick-and-place units for synchronously transferring the two breaker cushions from their respective conveyors to the tire building drum.

The lateral positions of the pick-and-place units are manually adjusted and aligned visually by a human operator to match the lateral position of the leading ends of the breaker cushions on the conveyors, prior to transfer of said breaker cushions to the tire building drum. The lateral positions of the pick-and-place units are then fixed prior to transferring of the breaker cushions, to ensure that the pick-and-place units are moved synchronously in the supply direction, without relative movements in the lateral direction.

SUMMARY OF THE INVENTION

A disadvantage of the known dual tire component servicer is that the lateral positions of the leading and trailing end of the tire components may still shift after cutting due to relaxation or tension inside the material of the tire components. Moreover, the lateral position of the trailing end may not be exactly aligned with the lateral position of the leading end of the same tire component. This is especially true for breaker cushion which, unlike other types of tire components, are not provided with embedded reinforcement cords. As such, cushions breaker are particularly susceptible to lateral shifts and deformations.

Moreover, the lateral positions of the two tire components may not be offset in the same direction or to the same extent.

When the tire components are applied around the tire building drum without any lateral corrections, the trailing end may not be accurately spliced to the leading end, thereby negatively impacting the overall quality of the tire.

It is an object of the present invention to provide a dual tire component servicer and a method for supplying dual tire components to a tire building drum, wherein the quality of the tire can be improved.

According to a first aspect, the invention provides a dual tire component servicer for supplying a first tire component and a second tire component to a tire building drum, wherein the dual tire component servicer comprises a first conveyor and a second conveyor for conveying the first tire component and the second tire component, respectively, in a supply direction towards the tire building drum, wherein the dual tire component servicer further comprises a first pick-and-place unit and a second pick-and-place unit for transferring the first tire component and the second tire component, respectively, from their respective conveyors to the tire building drum, wherein the first pick-and-place unit and the second pick-and-place unit are automatically and independently movable relative to each other in a lateral direction perpendicular to the supply direction.

By moving the pick-and-place units automatically and independently of each other in the lateral direction, the positions of the tire components in the lateral direction can be adjusted or corrected independently for each tire component during the transfer of the respective tire component. Hence, one pick-and-place unit may be moved laterally in one of the lateral directions while the other pick-and-place unit is moved in the opposite lateral direction, to a different extent or is not moved at all. Hence, the lateral positions of the tire components can be adjusted or corrected individually for optimal splicing of the respective trailing ends to the respective leading ends, thereby improving the overall quality of the tire to be build.

In the context of the present invention, the term 'automatically' is to be interpreted as a movement of the pick-and-place units by themselves, i.e. with no direct human control.

In one embodiment the dual tire component servicer comprises a first lateral drive and a second lateral drive that are individually controllable for driving the movements of the first pick-and-place unit and the second pick-and-place unit, respectively, in the lateral direction. The lateral drives can automatically and independently drive the lateral movements of the respective pick-and-place units, thereby automating said lateral movements.

In another embodiment the first pick-and-place unit and the second pick-and-place unit are synchronously movable in the supply direction. The dual tire component servicer may for example comprise a supply drive common to the first pick-and-place unit and the second pick-and-place unit for synchronously driving the movements of the pick-and-place units in the supply direction. Hence, only one supply drive is required to synchronously move both pick-and-place units.

In another embodiment the dual tire component servicer further comprises a first sensor unit upstream of the first pick-and-place unit and the second pick-and-place unit relative to the supply direction for detecting lateral positions of the first tire component and the second tire component on the first conveyor and the second conveyor, respectively. The first sensor unit can be used to correct the lateral positions of the tire components based on detection signals obtained upstream of the tire building drum, i.e. based on the lateral positions of the tire components on the respective conveyors.

In a combination previously discussed embodiments that introduced the lateral drives and the first sensor unit, the dual tire component servicer is provided with a control unit that is operationally connected to the first lateral drive, the second lateral drive and the first sensor unit for controlling the movements of the pick-and-place units in the lateral direction based on detection signals from the first sensor unit. Hence, the movements of the pick-and-place units can be fully automated and/or controlled autonomously by the control unit.

In another embodiment the dual tire component servicer further comprises a second sensor unit downstream of the first pick-and-place unit and the second pick-and-place unit relative to the supply direction for detecting lateral positions of the first tire component and the second tire component on the tire building drum. The detection signals of the second sensor unit can thus be used to determine any further movements of the pick-and-place unit required in the lateral direction to align the remaining portions of the tire components still to be transferred to the tire building drum, with the t portions of the tire components already on the tire building drum.

In a combination of the previously discussed embodiments that introduced the lateral drives and the second sensor unit, the dual tire component servicer is provided with a control unit that is operationally connected to the first lateral drive, the second lateral drive and the second sensor unit for controlling the movements of the pick-and-place units in the lateral direction based on detection signals from the second sensor unit. Hence, the movements of the pick-and-place units can be fully automated and/or controlled autonomously by the control unit.

In another embodiment the first tire component and the second tire component each have a leading end and a trailing end, wherein the first pick-and-place unit and the second pick-and-place unit are arranged for first transferring the leading end and subsequently transferring the trailing end of the first tire component and the second tire component, respectively, wherein the dual tire component servicer is provided with a control unit that is configured for controlling the movements of the first pick-and-place unit and the second pick-and-place unit in the lateral direction during at least one of the transferring of the leading ends and the transferring of the trailing ends such that the lateral positions of each tire component at the leading end and the trailing end are aligned. Hence, the lateral positions of the leading ends and the trailing ends can be positioned for each tire component independently for optimal splicing.

In another embodiment each pick-and-place unit comprises a gripper head and a retaining element for retaining the respective tire component to the gripper head. The tire components can thus be actively retained to the respective gripper heads.

Preferably, the retaining element is a suction element. This type of retaining is convenient when the tire component does not contain any metal reinforcement cords, which is the case with breaker cushions.

In a further embodiment each pick-and-place unit further comprises a release member for releasing the respective tire component from the retaining element. The release member can ensure a successful release, even when the retaining element is still active.

Preferably, the release member comprises a push-off plate that is movable relative to the retaining element in a pick-and-place direction transverse or perpendicular to the supply direction and the lateral direction. The push-off plate can physically separate the tire component from the retaining element, i.e. through direct contact.

More preferably, the push-off plate is movable between a retracted position at the same level as or above the retaining element in the pick-and-place direction and a push-off position below the retaining element in the pick-and-place direction. The push-off plate can thus generate a physical distance or spacing between the tire component and the retaining element, thereby effectively bring the tire component out of the effective range of the retaining element.

Most preferably, the push-off plate extends at least partially around the retaining element when the push-off plate is in the retracted position. The push-off plate can thus reliably separate the tire component from the retaining element along at least a part of the circumference of said retaining element.

In another embodiment the dual tire component servicer further comprises a first pressing unit and a second pressing unit for pressing the first tire component and the second tire component, respectively, onto the respective conveyors. The pressure exerted by the pressing units onto the tire components can prevent shifting of said tire components relative to the conveyors, in the supply direction and/or the lateral direction. The lateral positions of the tire components can thus be corrected by the pick-and-place units predominantly in the transfer area between the conveyors and the tire building drum, but not on the conveyors themselves.

Preferably, the first pressing unit and the second pressing unit are carried by the first pick-and-place unit and the second pick-and-place unit, respectively. Hence, no separate carriage is required for the pressing units. Moreover, the pressing units can be moved in the lateral direction and the supply direction together with the pick-and-place units.

More preferably, the first pressing unit and the second pressing unit are movable in a pick-and-place direction transverse or perpendicular to the supply direction and the lateral direction relative to the first pick-and-place unit and the second pick-and-place unit, respectively. Hence, the pressing units can be brought into contact with the tire components in a pressing position below or protruding below the pick-and-place units in the pick-and-place direction.

In a further embodiment each pressing unit comprises a first pressing wheel that is rotatable about a wheel axis parallel to the lateral direction. Preferably, the first pressing wheel is a profiled wheel with teeth. The pressing wheel can run over the tire component as it is being advanced by the conveyor in the supply direction. The profile of the wheel can increase friction and/or ensure that the tire component remains in position on the respective conveyor as long the respective pressing unit is exerted pressure onto said tire component.

In a further embodiment each pressing unit comprises a second pressing wheel coaxial to and spaced apart from the first pressing wheel. Preferably, the second pressing wheel is a profiled wheel with teeth. The set of two pressing wheels can exert pressure onto the tire component at two laterally spaced apart positions, thereby effectively preventing warping or bending of the tire component on the conveyor.

In a further embodiment the first tire component and the second tire component each have a leading end and a trailing end, wherein the dual tire component servicer further comprises at least one of a first sensor unit upstream of the first pick-and-place unit and the second pick-and-place unit relative to the supply direction and a second sensor unit downstream of the first pick-and-place unit relative to the supply direction, wherein the dual tire component servicer is provided with a control unit that is configured for controlling, based on detection signals from the first sensor unit and/or the second sensor unit, a speed ratio between the respective conveyor and the tire building drum to adjust said length for at least one of the tire components. The length can be adjusted for optimal splicing of the respective trailing ends to the respective leading ends. The tire components may for example be stretched slightly if the length, as detected by the first sensor unit, or the application position of the leading end on the tire building drum, as detected by the second sensor unit, appears to be insufficient to form a closed splice.

In another embodiment the tire components are breaker cushions. As mentioned earlier, breaker cushions are particularly susceptible to lateral shifts and deformations because they lack embedded reinforcement cords.

According to a second aspect, the invention provides a method for supplying a first tire component and a second tire component to a tire building drum with the use of the dual tire component servicer according to any one of the embodiments according to the first aspect of the invention, wherein the method comprises the steps of:

transferring the first tire component and the second tire component from their respective conveyors to the tire building drum; and during said transferring, independently moving the first pick-and-place unit and the second pick-and-place unit relative to each other in the lateral direction.

The method relates to the practical implementation of the dual tire component servicer according to the first aspect of the invention and thus has the same technical advantages, which will not be repeated hereafter.

In one embodiment the first pick-and-place unit and the second pick-and-place unit are synchronously moved in the supply direction.

In another embodiment the first tire component and the second tire component each have a leading end and a trailing end, wherein the first pick-and-place unit and the second pick-and-place unit first transfer the leading end and subsequently transfer the trailing end of the first tire component and the second tire component, wherein the first pick-and-place unit and the second pick-and-place unit are moved in the lateral direction during at least one of the transferring of the leading ends and the transferring of the trailing ends such that the lateral positions of each tire component at the leading end and the trailing end are aligned.

In another embodiment the first tire component and the second tire component are retained to the first pick-and-place unit and the second pick-and-place unit, respectively, wherein the method further comprises the step of releasing the first tire component and the second tire component from the first pick-and-place unit and the second pick-and-place unit, respectively, by pushing off said first tire component and said second tire component from the first pick-and-place unit and the second pick-and-place unit, respectively.

In another embodiment the method further comprises the step of pressing the first tire component and the second tire component, respectively, onto the respective conveyors. The tire components may for example be pressed with the aforementioned pressing units. The pressure exerted by the pressing units onto the tire components can prevent shifting of said tire components relative to the conveyors, in the supply direction and/or the lateral direction. The lateral positions of the tire components can thus be corrected by the pick-and-place units predominantly in the transfer area between the conveyors and the tire building drum, but not on the conveyors themselves.

In another embodiment the first tire component and the second tire component each have a leading end and a trailing end and a length between the respective leading end and the respective trailing end, wherein the method further comprises the step of adjusting a speed ratio between the respective conveyor and the tire building drum to adjust said length for at least one of the tire components.

In another embodiment the tire components are breaker cushions.

According to a third, unclaimed aspect, the invention provides a tire component servicer for supplying a first tire component to a tire building drum, wherein the tire component servicer comprises a first conveyor for conveying the first tire component in a supply direction towards the tire building drum, wherein the tire component servicer further comprises a first pick-and-place unit for transferring the first tire component from the first conveyor to the tire building drum, wherein the tire component servicer further comprises a first sensor unit upstream of the first pick-and-place unit relative to the supply direction for detecting lateral position of the first tire component on the first conveyor and a second sensor unit downstream of the first pick-and-place unit relative to the supply direction for detecting lateral position of the first tire component on the tire building drum, wherein the tire component servicer is provided with a control unit that is operationally connected to the first sensor unit and the second sensor unit for comparing the detection signals from the first sensor unit and the second sensor unit.

The lateral position of the leading end can first be measured by the first sensor unit upstream of the first pick-and-place unit. However, after the initial detection, the leading end is advanced by the first conveyor in the supply direction and subsequently picked-up, transferred and applied onto the tire building drum by the first pick-and-place unit. During each of said operations, the lateral position of the leading end may still change. By comparing the detection signals, corrective action can be taken when the leading end of the first tire component is in a laterally different position than the trailing end of the first tire component, based on the last known position of said leading end on the tire building drum. This means that the trailing end can be positioned more accurately in the lateral direction.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

FIGS. 1-10 show a tire component servicer 1, in particular a dual tire component servicer 1, according to an exemplary embodiment of the invention.

The dual tire component servicer 1 is used for supplying a first tire component 91 and a second tire component 92 to a tire building drum D. The tire components 91, 92 are supplied to and/or applied around the tire building drum D synchronously or simultaneously. In this exemplary embodiment, the tire components 91, 92 are breaker cushions, which are typically used in the shoulder areas of truck tires, between the body plies and the belt-and-tread package. Such breaker cushions are not reinforced with embedded reinforcement cords and, as such, are susceptible to shrinking, stretch, bending, warping and/or other deformations. Each tire component 91, 92 has a leading end LE1, LE2 facing the tire building drum D and a trailing end TE1, TE2 facing away from the tire building drum D.

Figure 1:
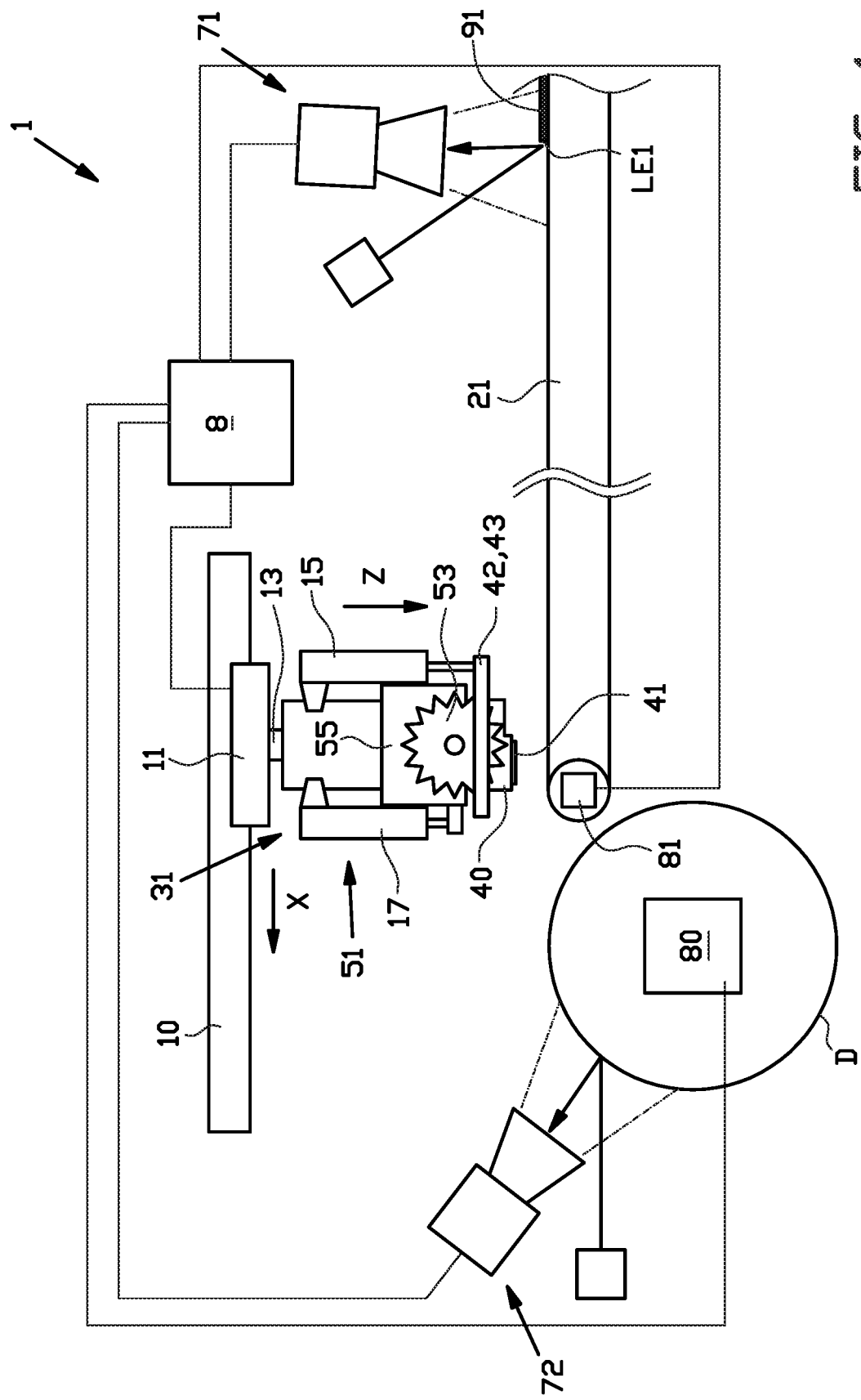
FIGS. 1-6 show side views of a dual tire component servicer according to the invention during the steps of a method for supplying a first tire component and a second tire component to a tire building drum.

As shown in FIG. 1, the tire building drum D is provided with or connected to a drum drive 80 for rotating the tire building drum D about a central drum axis.

Figure 10:
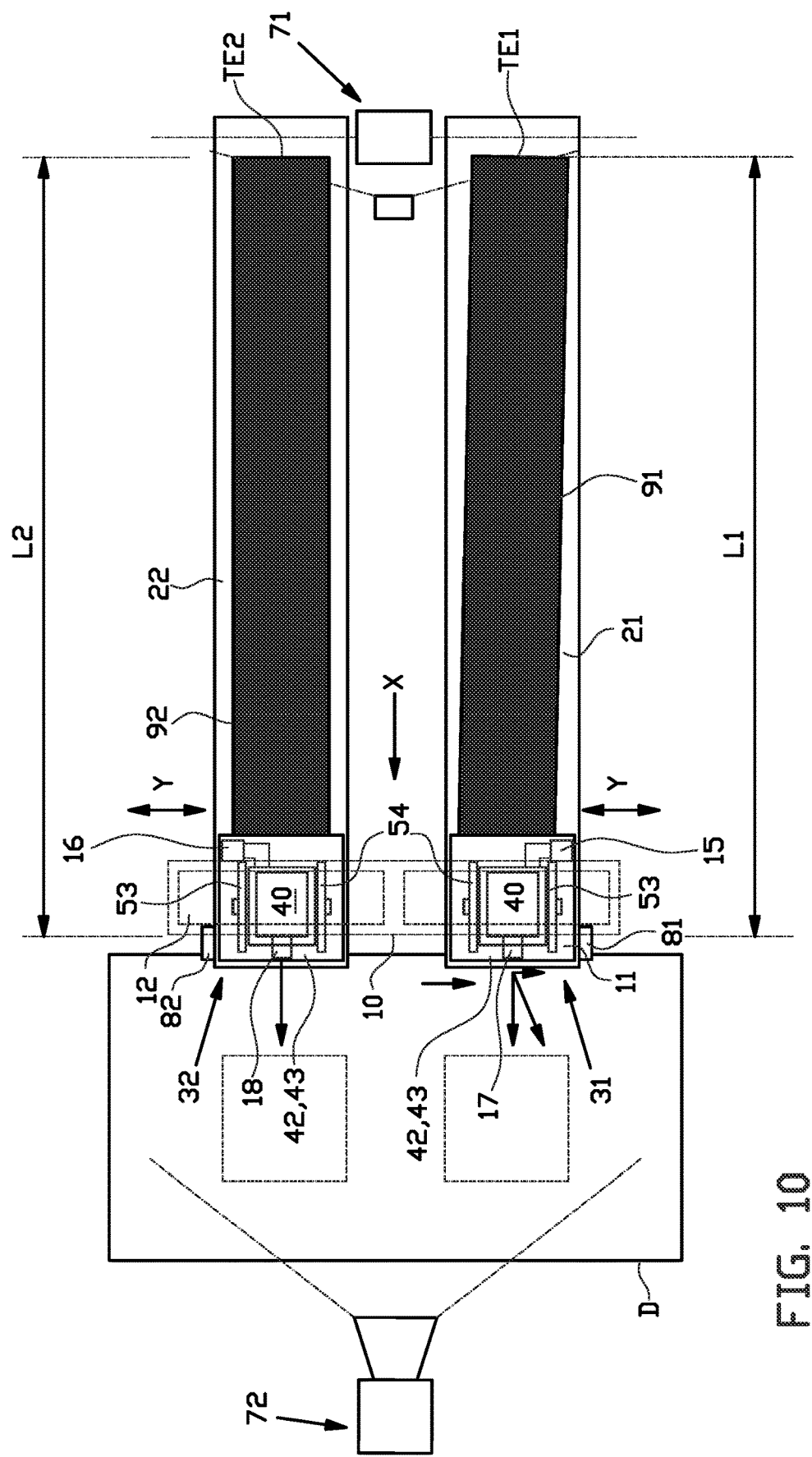
FIG. 10 shows a top view of the dual tire component servicer during the steps of FIGS. 2 and 3.

As shown in FIG. 10, the dual tire component servicer 1 comprises a first conveyor 21 and a second conveyor 22 for conveying the first tire component 91 and the second tire component 92, respectively, in a supply direction X towards the tire building drum D. The conveyors 21, 22 may be belt conveyors or roller conveyors. The conveyors 21, 22 extend parallel to each other and parallel to the supply direction X. The dual tire component servicer 1 is provided with a first conveyor drive 81 for driving the first conveyor 21 and a second conveyor drive 82 for driving the second conveyor 22. Both conveyor drives 81, 82 may be controlled synchronously or asynchronously, i.e. independently.

Figure 7:
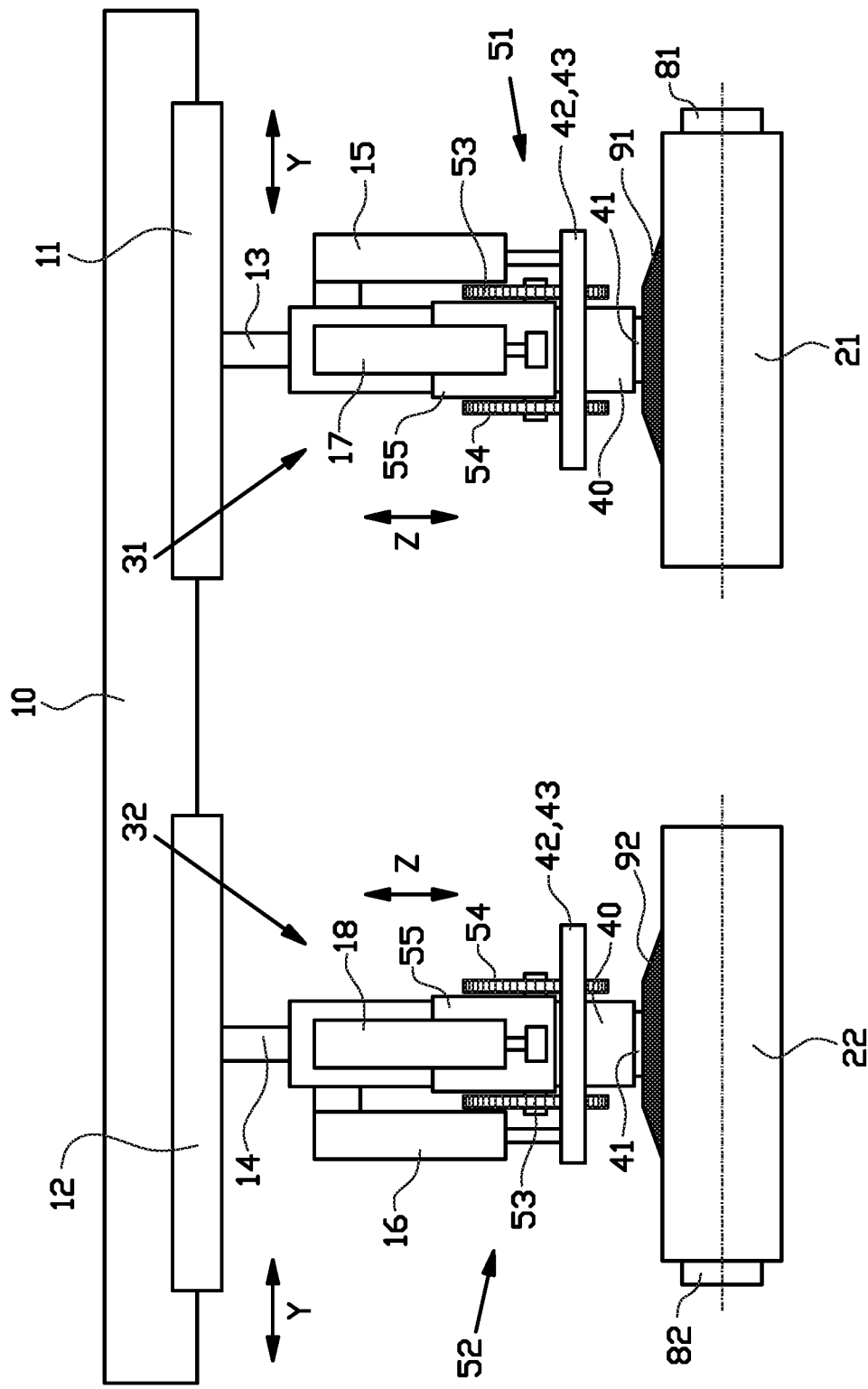
FIGS. 7, 8 and 9 show front views of the dual tire component servicer during the steps of FIGS. 2, 3 and 4, respectively.

As shown in FIG. 7, the dual tire component servicer 1 further comprises a first pick-and-place unit 31 and a first pressing unit 51 for handling the first tire component 91 and a second pick-and-place unit 32 and a second pressing unit 52 for handling the second tire component 92.

In FIGS. 1-6, only the first conveyor 21, the first pick-and-place unit 31, the first pressing unit 51 and the first tire component 91 are shown. It will however be apparent that any features and/or functionality described in relation to these parts, apply mutatis mutandis to the second conveyor 22, the second pick-and-place unit 32, the second pressing unit 52 and the second tire component 92.

As shown in FIG. 10, the first pick-and-place unit 31 and the second pick-and-place unit 32 are synchronously movable in the supply direction X. In particular, the dual tire component servicer 1 comprises a supply drive 10 common to the first pick-and-place unit 31 and the second pick-and-place unit 32 for synchronously driving the movements of the pick-and-place units 31, 32 in the supply direction X. The supply drive 10 may be an overhead rail.

As further shown in FIG. 10, the first pick-and-place unit 31 and the second pick-and-place unit 32 are independently movable relative to each other in a lateral direction Y perpendicular to the supply direction X. In particular, the dual tire component servicer 1 comprises a first lateral drive 11 and a second lateral drive 12 that are individually controllable for driving the movements of the first pick-and-place unit 31 and the second pick-and-place unit 32, respectively, in the lateral direction Y. Hence, the movements of the pick-and-place units 31, 32 in the lateral direction Y be controlled can individually and/or independently. The pick-and-place units 31, 32 may be moved synchronously, but also asynchronously if so required, in the lateral direction Y. The lateral drives 11, 12 may be linear drives, for example servo motors or pistons. The lateral drives 11, 12 are preferably mounted or positioned between the pick-and-place units 31, 32 and the supply drive 10 to move said pick-and-place units 31, 32 in the lateral direction Y relative to the supply drive 10.

The pick-and-place units 31, 32 will now be described with reference to the first pick-and-place unit 31 and the first pressing unit 51 in FIGS. 1 and 7 only. It will be apparent that the features and/or functionality described hereafter applies mutatis mutandis to the second pick-and-place unit 32 and the second d pressing unit 52, respectively.

Figure 3:
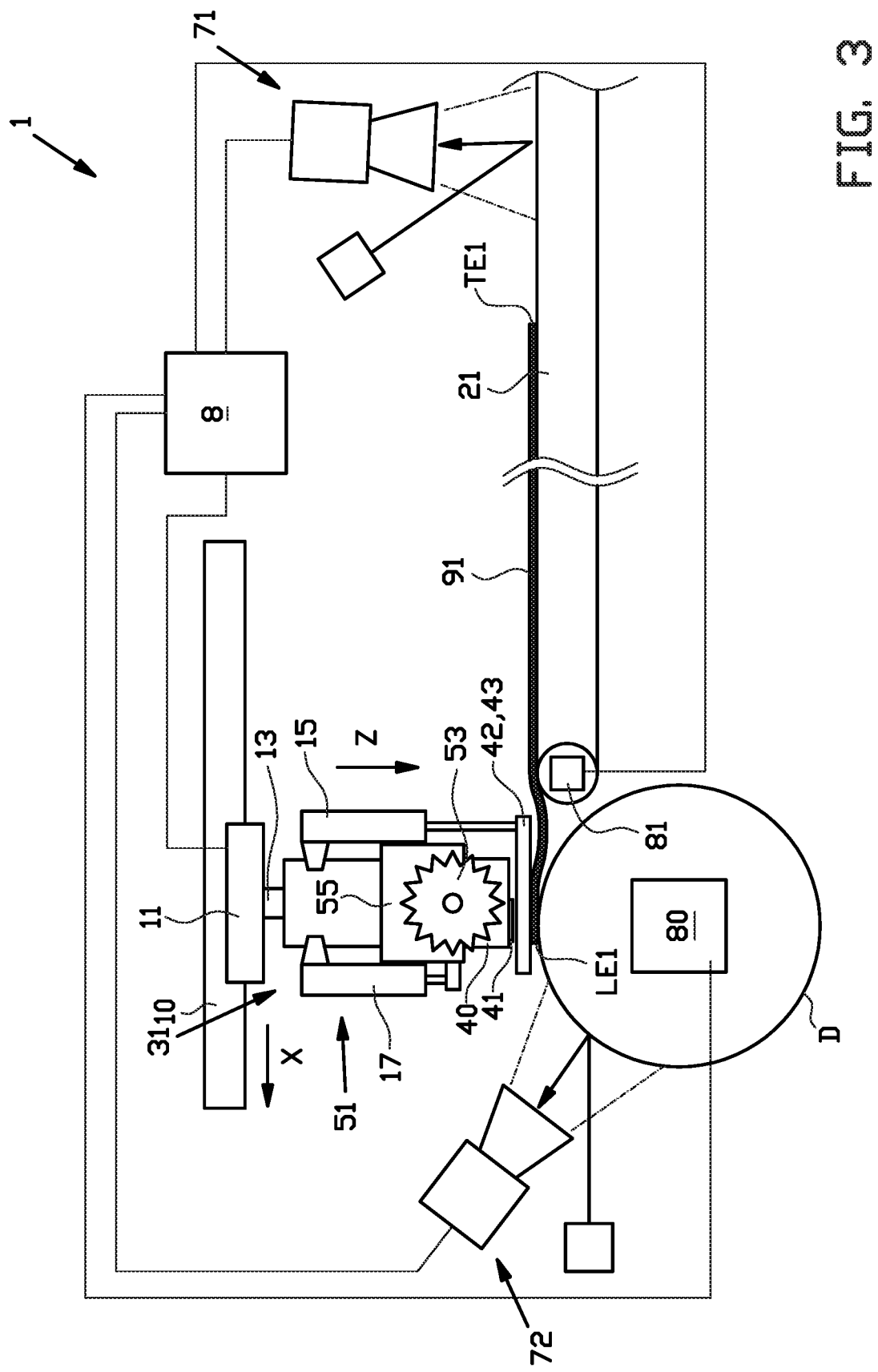

As shown in FIGS. 1 and 7, the first pick-and-place unit 31 comprises a gripper head 40 and a retaining element 41 for retaining the respective tire component 91, 92 to the gripper head 40. In this exemplary embodiment the retaining element 41 is a suction element. Alternatively, another suitable retaining element may be used, such as magnets, grippers, needles or the like, depending on the type of the first tire component 91 to be retained. The gripper head 40 is movable in a pick-and-place direction Z transverse or perpendicular to the supply direction X and the lateral direction Y to pick-up the first tire component 91 from the conveyor 21, as shown in FIGS. 1 an 2, and to place said first tire component 91 onto the tire component, as shown in FIG. 3. In particular, as shown in FIG. 7, the dual tire component servicer 1 is provided with a first pick-and-place drive 13 and a second pick-and-place drive 14 for driving the movements of the first pick-and-place unit 31 and the second pick-and-place unit 32, respectively, in the pick-and-place direction Z relative to the respective lateral drives 11, 12. The pick-and-place drives 13, 14 may be linear drives, such as servo motors or pistons.

It is noted that the supply drive 10, the first lateral drive 11 and the first pick-and-place drive 13 essentially form an XYZ drive system for the first pick-and-place unit 31. Similarly, the supply drive 10, the second lateral drive 12 and the second pick-and-place drive 14 essentially form an XYZ drive system for the second pick-and-place unit 32.

Figure 8:
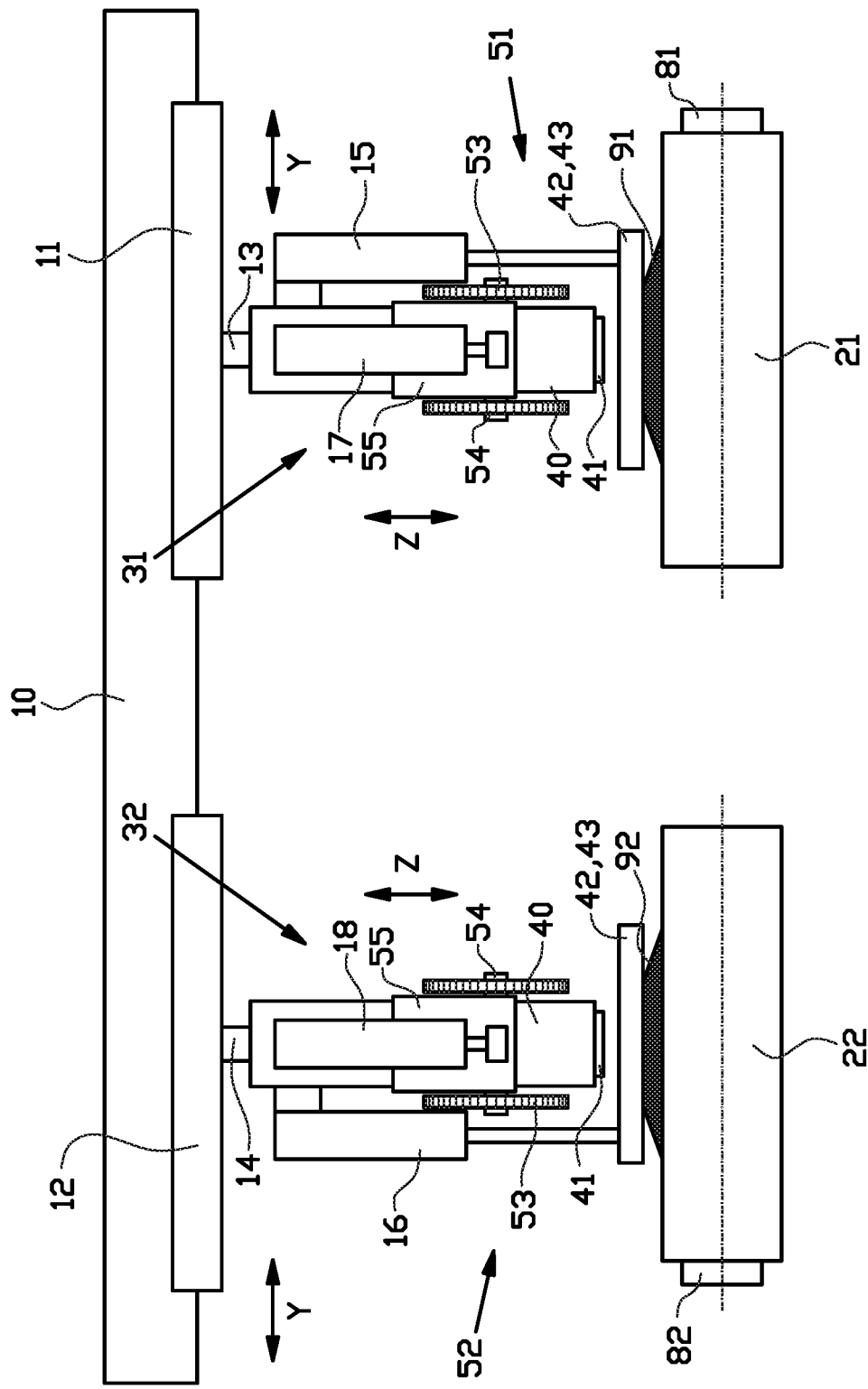

As shown in FIGS. 3 and 8, the first pick-and-place unit 31 further comprises a release member 42 for releasing the first tire component 91 from the retaining element 41, for example in a position at or above the tire building drum D, as shown in FIG. 3, to transfer the first tire component 91 from the first pick-and-place unit 31 onto the tire building drum D. Note that in FIG. 8, the tire building drum D is not shown, but it will be understood that, with FIG. 8 being a front view of FIG. 3, the release member 42 may still be positioned overhead the tire building drum D in the position as shown. In this exemplary embodiment, the release member 42 comprises a push-off plate 43 that is movable relative to the retaining element 41 in the pick-and-place direction Z. As best seen in FIG. 10, the push-off plate 43 extends at least partially around the retaining element 41 when the push-off plate 43 is in the retracted position.

Figure 2:
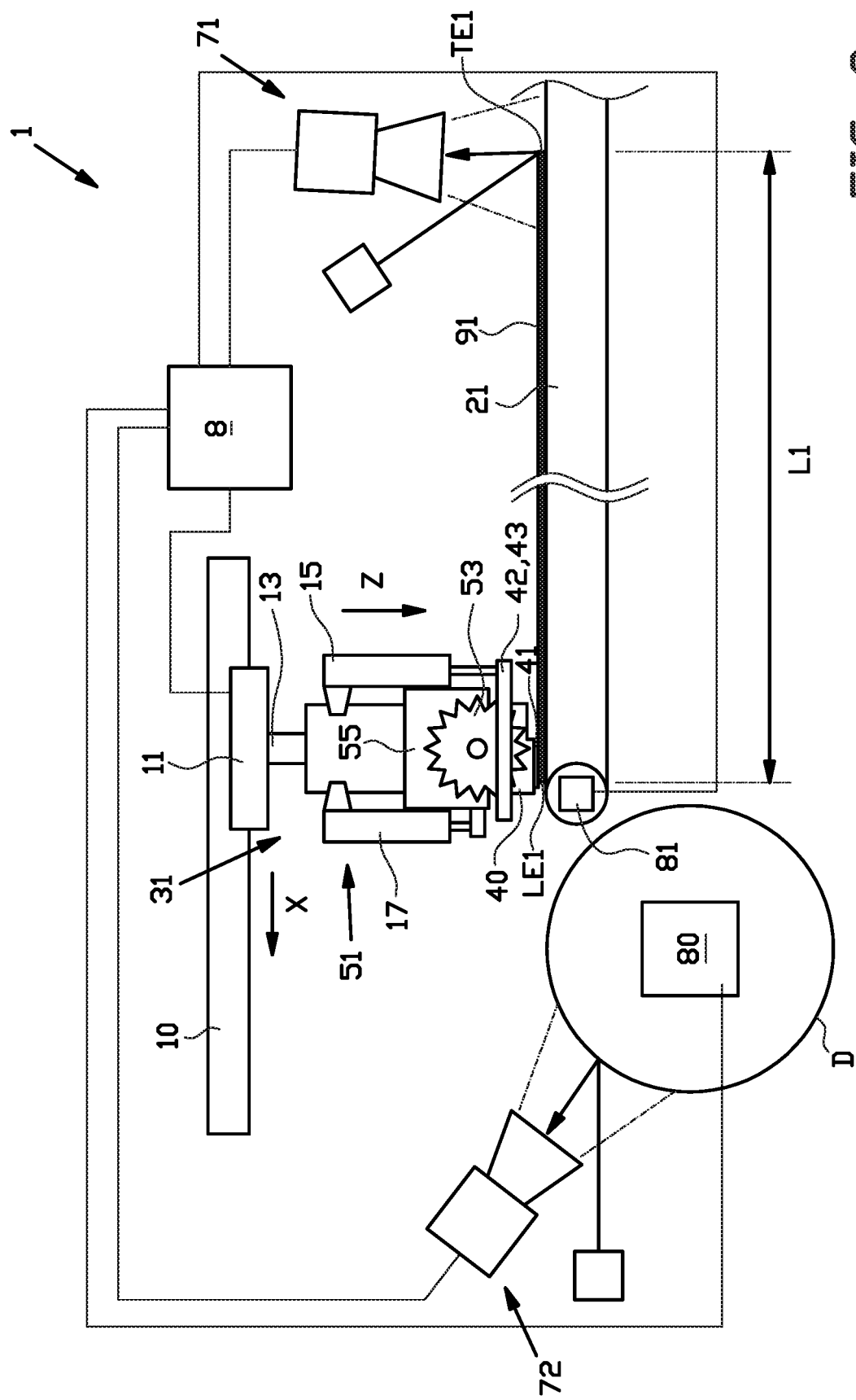

The push-off plate 43 is movable between a retracted position at the same level as or above the retaining element 41 in the pick-and-place direction Z, as shown in FIGS. 2 and 7, and a push-off position below the retaining element 41 in the pick-and-place direction Z, as shown in FIGS. 3 and 8. In particular, as shown in FIGS. 7 and 8, the dual tire component servicer 1 comprises a first push-off drive 15 and a second push-off drive 16 for driving the movement of the push-off plate 43 in the pick-and-place direction Z relative to the gripper head 40 of the respective pick-and-place unit 31, 32.

Figure 4:
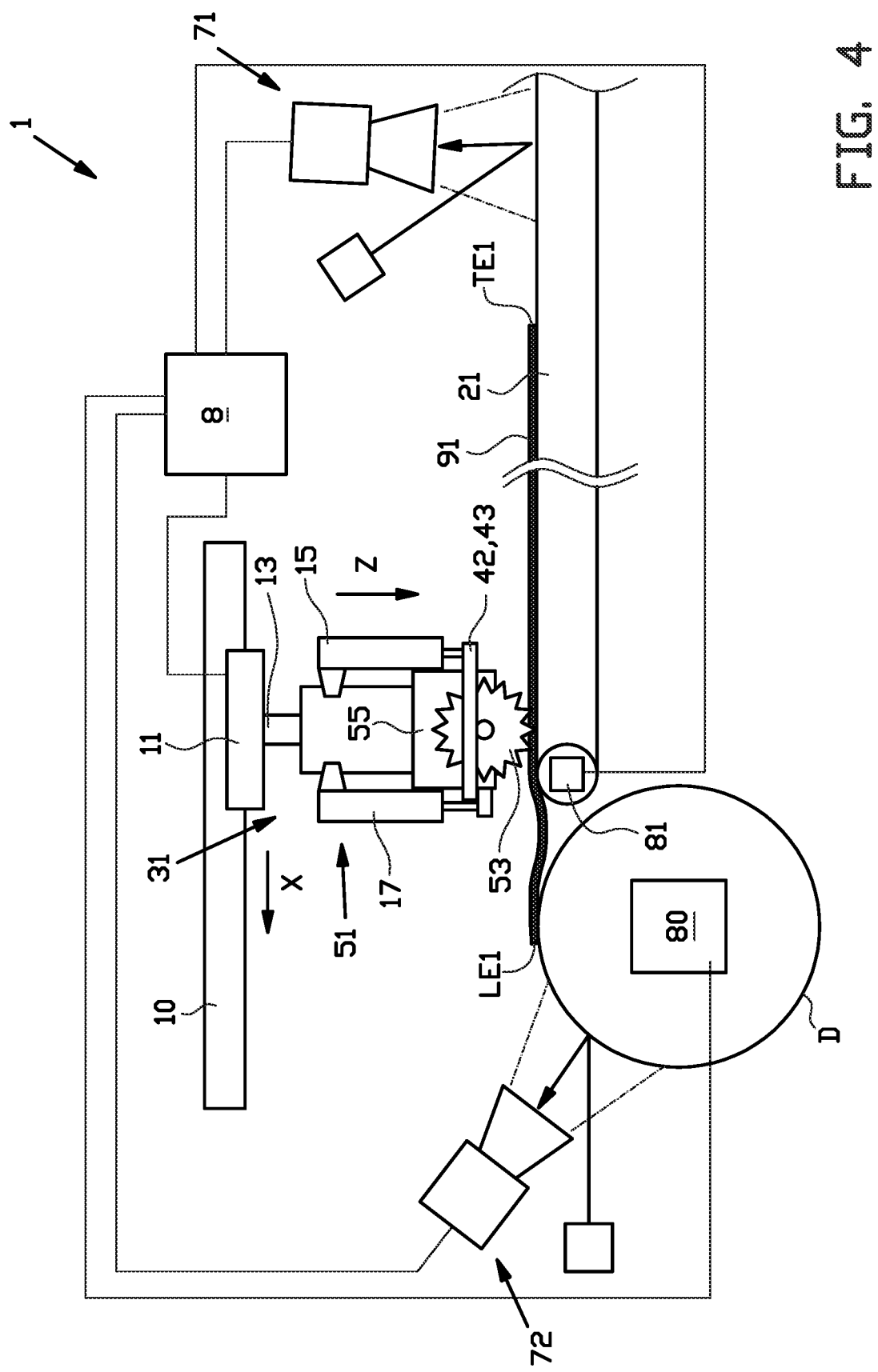
Figure 9:
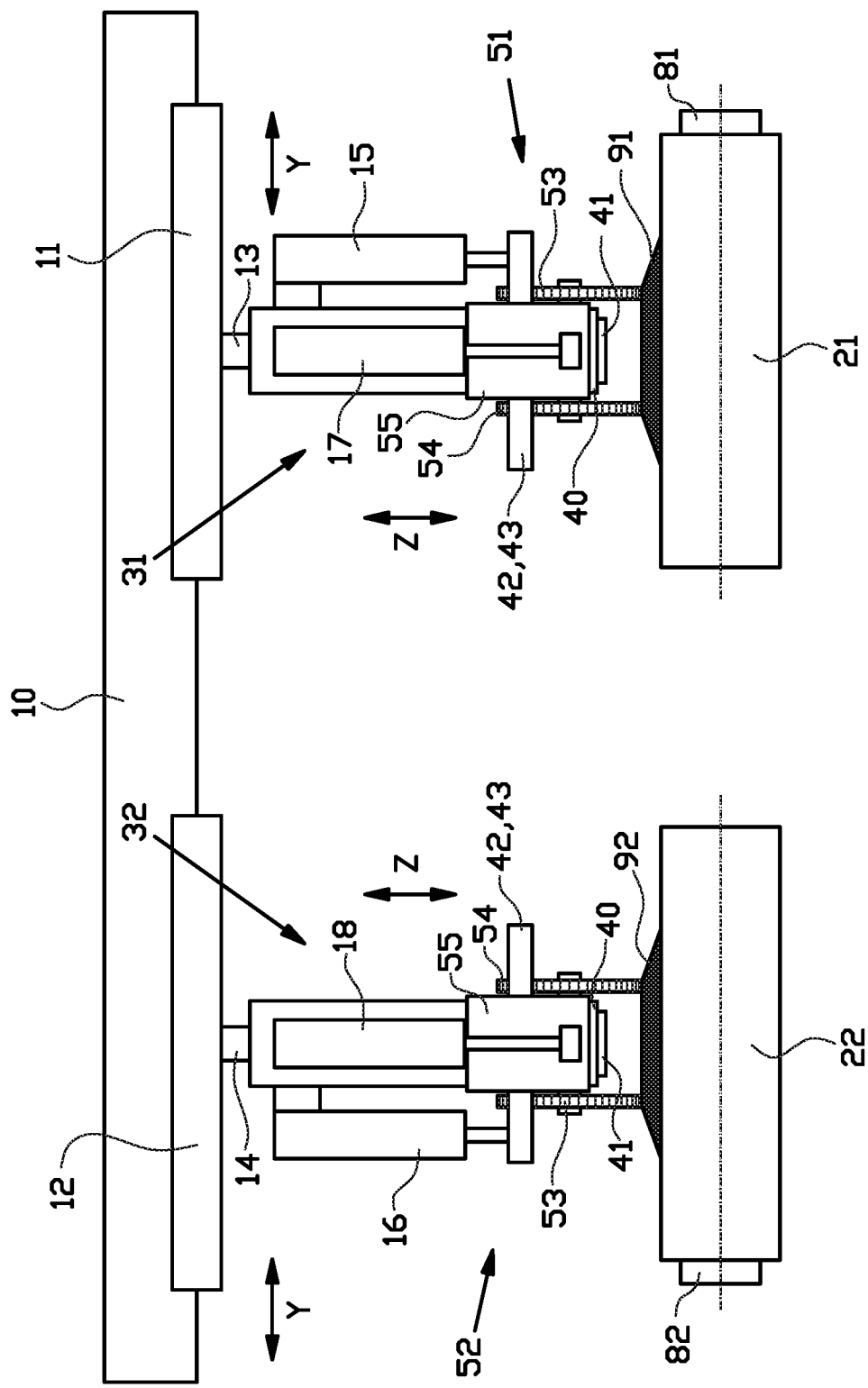

As shown in FIGS. 4 and 9, the first pressing unit 51 is configured or arranged for pressing the first tire component 91 onto the first conveyor 21. In this exemplary embodiment, the first pressing unit 51 is carried by or integrated with the first pick-and-place unit 31. The dual tire component servicer 1 comprises a first pressing drive 17 for moving the pressing unit 51 in the pick-and-place direction Z relative to the first pick-and-place unit 31 between an inactive position in which the first pressing unit 51 extends at the same level or above the retaining element 41 and does not contact and/or exert pressure onto the first tire component, as shown in FIGS. 1, 2, 7 and 8, and a pressing position in which first pressing unit 51 extends below the retaining element 41 and exerts a pressure force onto the first tire component 91, as shown in FIGS. 4 and 9. As shown in FIG. 9, the dual tire component servicer 1 comprises a second pressing drive 18 for moving the second pressing unit 52 in the same way relative to the second pick-and-place unit 32.

In the aforementioned embodiment, the first pressing unit 51 is carried by and/or integrated with the first pick-and-place unit 31. Alternatively, the pressing units 51, 52 may be configured to operate independently of the pick-and-place units 31, 32, i.e. with their own drives to move in the supply direction X and the pick-and-place direction Z.

As best seen in FIG. 9, the first pressing unit 51 comprises a first pressing wheel 53 and a second pressing wheel 54 coaxial to and spaced apart from the first pressing wheel 54. The pressing wheels 53, 54 are rotatable about a wheel axis S parallel to the lateral direction Y. As such, the pressing wheels 53, 54 can run over or run along the upper surface of the first tire component 91 parallel to the supply direction X. In this exemplary embodiment, the pressing wheels 53, 54 are located on opposite sides of the gripper head 40 in the lateral direction Y. In particular, the pressing wheels 53, 54 are mounted to a sleeve 55 that is fitted around the gripper head 40 and slidable relative to said gripper head 40 in the pick-and-place direction Z.

Both pressing wheels 53, 54 are profiled wheels. Preferably, the profile comprises teeth that effectively increase the grip or friction between the pressing wheels 53, 54 and the first tire component 91.

As shown in FIGS. 1 and 10, the dual tire component servicer 1 is further provided with a first sensor unit 71 upstream of the pick-and-place units 31, 32 and a second sensor unit 72 downstream of the pick-and-place units 31, 32 relative to or considered in the supply direction X. The sensor units 71, 72 are adapted, arranged programmed or configured for detecting or capturing images of the positions, contours, edges, profiles, height and/or thickness of the tire components 91, 92. To this end, each sensor unit 71, 72 may comprise means for laser triangulation and/or imaging, such as lasers, cameras, lights and the like. Alternatively, mechanical means, such as fingers, rollers, or the like may be used to physically contact and/or detect edges, height changes and the like.

The first sensor unit 71 is configured for detecting lateral positions of the first tire component 91 and the second tire component 92 on the first conveyor 21 and the second conveyor 22, respectively. As shown in FIGS. 2 and 10, the first sensor unit 71 may be additionally arranged for length measurement, i.e. by detecting the passage of and/or the longitudinal positions of the leading ends LE1, LE2 and the trailing ends TE1, TE2 of the respective tire components 91, 92 in the supply direction X, optionally in combination with an encoder or feedback from the respective conveyor drives 81, 82 to determine the length L1, L2 of the tire component 91, 92 that has passed between the detection of both ends LE1, LE2, TE1, TE2.

The second sensor unit 72 is configured for detecting lateral positions of the first tire component 91 and the second tire component 92 on the tire building drum D. Preferably, the second sensor unit 72 is configured to detect said lateral positions on the tire building drum D as close as possible to the angular position on the tire building drum D where the leading ends LE1, LE2 of the tire components 91, 92 are initially applied.

In this exemplary embodiment, a single first sensor unit 71 is used to detect and/or capture the area of both first conveyors 21, 22. Similarly, a single second sensor unit 72 is used to detect and/or capture the area of the tire building drum D receiving both tire components 91, 92. Alternatively, separate first sensor units 71 may be provided for each conveyor 21, 22 and separate second sensor units 72 may be provided for the two areas of the tire building drum D receiving the tire components 91, 92. The sets of sensor units 71, 72 may be independently adjustable in the lateral direction Y depending on the spacing between the conveyors 21, 22, the spacing between the tire components 91, 92 supported by said conveyors 21, 22 and/or the width of the tire components 91, 92.

As shown in FIG. 1, the dual tire component servicer 1 is further provided with a control unit 8 that is operationally and/or electronically connected to the supply drive 10, the lateral drives 11, 12, the pick-and-place drives 13, 14, the push-off drives 15, 16, the pressing drives 17, 18, the sensor units 71, 72, the drum drive 80 and/or the conveyor drives 81, 82. The control unit 8 has a processor and a memory with computer-readable instruction that—when executed by the processor—cause the control unit 8 to control the movements of the pick-and-place units 31, 32 and/or the pressing units 51, 52 in the supply direction X, the lateral direction Y and/or the pick-and-place direction Z based on detection signals received from the first sensor unit 71 and/or the second sensor unit 72. The memory is preferably a non-transitory memory.

A method for supplying the tire components 91, 92 to the tire building drum D with the use of the aforementioned dual tire component servicer 1 will now be elucidated with reference to FIGS. 1-10.

FIG. 1 shows the situation in which the first tire component 91 is being advanced by the first conveyor 21 in the supply direction X. The leading end LE1 of the first tire component 91 has been detected by the first sensor unit 71. The position of the leading end LE1 in the lateral direction Y, the longitudinal position and/or the time of detection is stored in the memory of the control unit 8. The first pick-and-place unit 31 is in an inactive position above and/or spaced apart from the first conveyor 21. The control unit 8 may already compare the stored position of the leading end LE1 with the current position of the first pick-and-place unit 31 in the lateral direction Y and—if required—automatically control the first lateral drive 11 to move the first pick-and-place unit 31 laterally for aligning the pick-and-place unit 31 with the position of the leading end LE1 in the lateral direction Y.

FIGS. 2 and 7 show the situation in which the first tire component 91 has been advanced further by the first conveyor 21 until the leading end LE1 is positioned underneath the first pick-and-place unit 31, at or near the distal end of the first conveyor 21. The first pick-and-place unit 31—if not aligned already—is automatically laterally aligned with the previously detected position of the leading end LE1 in the lateral direction X and is subsequently moved down in the pick-and-place direction Z until the retaining element 41 contacts the first tire component 91 at the leading end LE1 thereof.

It will be apparent that the second pick-and-place unit 32 can be controlled automatically and independently of the first pick-and-place unit 31 to align with and pick-up the leading end LE2 of the second tire component 92.

Meanwhile, the first sensor unit 71 has detected the trailing end TE1 of the first tire component 91. The position of the trailing end TE1 in the lateral direction Y, the longitudinal position and/or the time of detection is stored in the memory of the control unit 8. The control unit 8 may now calculate the length of the first tire component 91 between the leading end LE1 and the trailing end TE1, for example based on the elapsed time between detecting the leading end LE1 and the trailing end TE1 and encoder data. The control unit 8 may also compare the positions of the leading end LE1 and the trailing end TE1 in the lateral direction Y.

FIGS. 3, 8 and 10 show the step in which the control unit 8 has controlled the supply drive 10, the lateral drives 11, 12 and/or the pick-and-place drives 13, 14 to move both pick-and-place units 31, 32 along a transfer path to transfer the respective tire components 91, 92 retained thereto onto the tire building drum D. The transfer path may include an upward movement as the pick-and-place units 31, 32 lift the tire components 91, 92 from the respective conveyors 21, 22 and a downward movement as the pick-and-place units 31, 32 place the tire components 91, 92 onto the tire building drum D. Alternatively, the transfer path may be at least partially coplanar with the conveyors 21, 22.

As shown in FIG. 10, the control unit 8 may control the respective drives 10-14 to move the pick-and-place units 31, 32 automatically and independently relative to each other in the lateral direction X to correct any offset between the respective leading ends LE1, LE2 and the respective trailing end TE1, TE2 during the transfer along the transfer path. The transfer path may therefore be parallel to the supply direction X if no correction is required, or at an angle to the supply direction X if a correction is required.

As shown in FIGS. 3 and 8, the release members 42 of the pick-and-place units 31, 32 are activated once the leading ends LE1, LE2 are transferred onto the tire building drum D, to release the tire components 91, 92 from the pick-and-place units 31, 32.

FIGS. 4 and 9 show the situation in which the pick-and-place units 31, 32 have been returned to and lowered into a pressing position above the respective conveyors 21, 22. The control unit 8 has controlled the pressing drives 17, 18 to move the pressing units 51, 52 down in the pick-and-place direction Z into contact with the tire components 91, 92. In particular, the pressing wheels 53, 54 are configured to contact and run over the tire components 91, 92 as they are advanced further by the respective conveyors 21, 22. The pressing units 51, 52 apply or exert pressure onto tire components 91, 92 at least in a part of the main body of said tire components 91, 92 between the respective leading ends LE1, LE2 and trailing ends TE1, TE2.

With the leading ends LE1, LE2 already applied onto the tire building drum D, the second sensor unit 72 may detect the positions of said leading ends LE1, LE2 on the tire building drum D, as shown in FIG. 10. These positions may be stored in the memory of the control unit 8 and can be compared with the positions of the respective trailing ends TE1, TE2 to determine if any lateral correction of one or both of the trailing ends TE1, TE2 is required to align said trailing ends TE1, TE2 with the actual or last known position of the respective leading ends LE1, LE2 on the tire building drum D.

Figure 5:
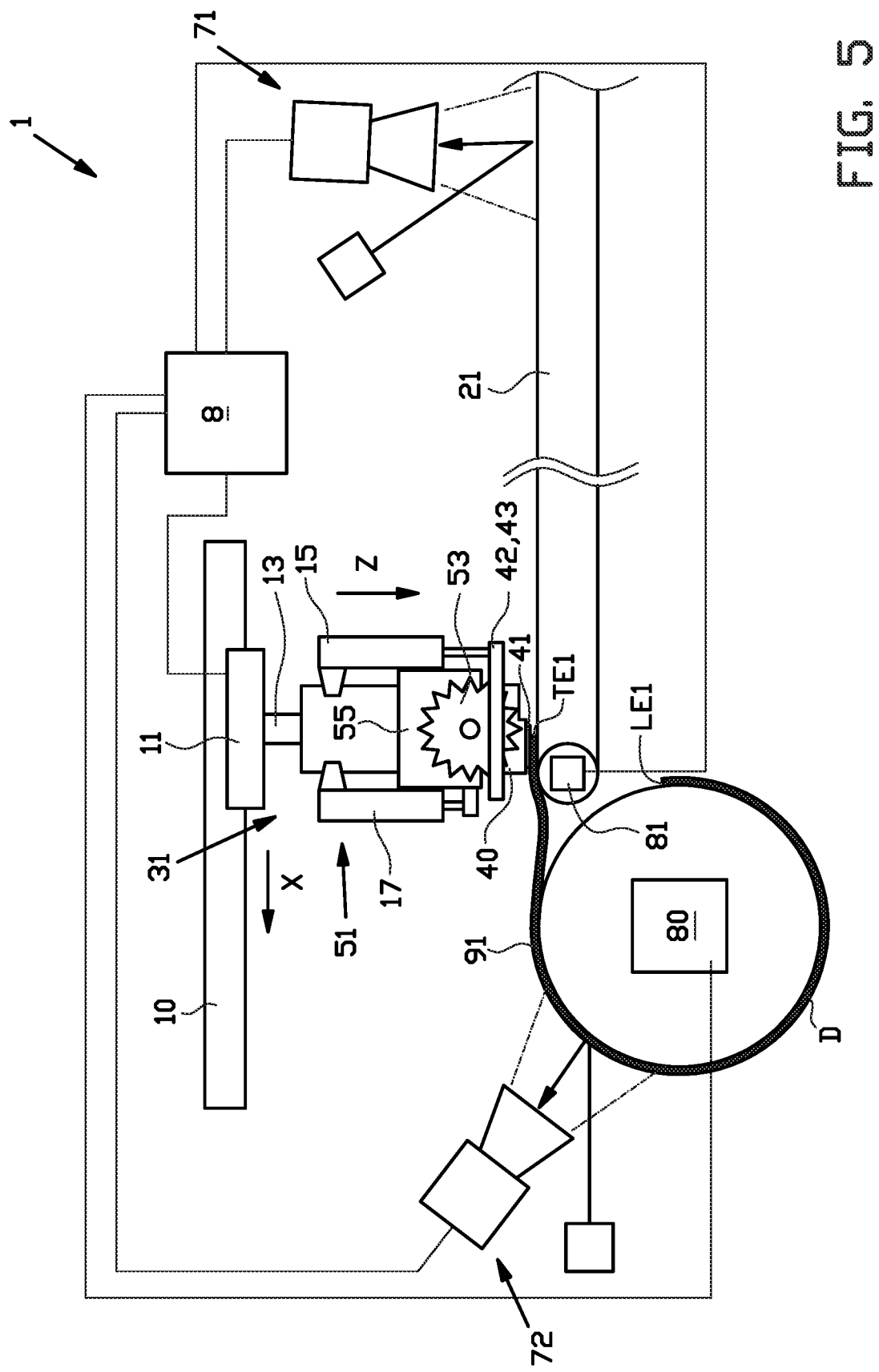

FIG. 5 shows the situation in which the trailing end TE1 of the first tire component 91 has reached a position at or near the end of the first conveyor 21, below the first pick-and-place unit 31. The steps of FIGS. 2 and 3 are now repeated in FIGS. 5 and 6 for the trailing ends TE1, TE2 of both tire components 91, 92. Again, the positions of the pick-and-place units 31, 32 in the lateral direction Y can be controlled automatically and independently relative to each other, similar to the movements shown in FIG. 10, to correct lateral misalignment between the trailing ends TE1, TE2 and the leading ends LE1, LE2.

Figure 6:
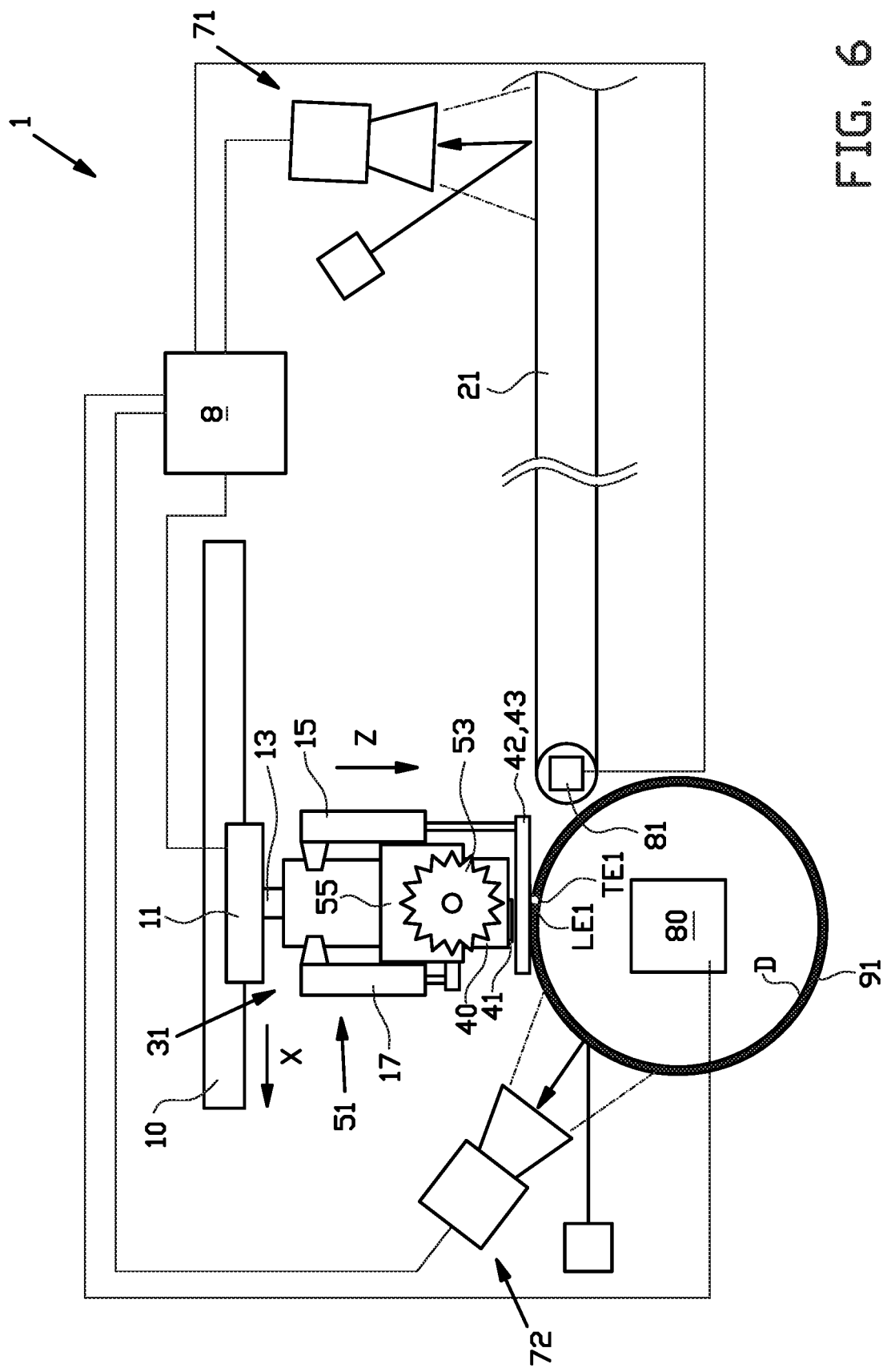

In FIG. 6 the trailing ends TE1, TE2 have been transferred onto the tire building drum D and are ready to be spliced and/or stitched to the respective leading ends LE1, LE2.

During the aforementioned steps, the length of the tire components 91, 92 between their respective leading ends LE1, LE2 and trailing ends TE1, TE2 may be determined based on detection signals of first sensor unit 71 and compared to an optimal length for splicing. Additionally or alternatively, detection signals of the second sensor unit 72 may be used to determine the actual application positions of the respective leading ends LE1, LE2 on the tire building drum D, which information can be used to determine the optimal application positions of the respective trailing ends TE1, TE2 to obtain a closed splice. The control unit 8 may subsequently control the drum drive 80 and/or the conveyor drives 81, 82 to adjust the speed ratio between the respective conveyors 21, 22 and the tire building drum D. For example, when the first tire component 91 is too short, the circumferential speed of the tire building drum D may be set to a higher value than the conveying speed of the first conveyor 21. Alternatively, the conveying speed of the first conveyor 21 can be reduced. The ratio may be kept the same for both conveyors 21, 22 relative to the tire building drum D, or it may be controlled independently, i.e. by controlling the conveyor drives 81, 82 to move the conveyors 21, 22 at different conveying speeds, depending on the amount of correction required for each tire component 91, 92 to obtain a closed splice between the respective leading ends LE1, LE2 and the respective trailing ends TE1, TE2.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

LIST OF REFERENCE NUMERALS

1 dual tire component servicer
10 supply drive
11 first lateral drive
12 second lateral drive
13 first pick-and-place drive
14 second pick-and-place drive
15 first push-off drive
16 second push-off drive
17 first pressing drive
18 second pressing drive
21 first conveyor
22 second conveyor
31 first pick-and-place unit
32 second pick-and-place unit
40 gripper head
41 retaining element
42 release member
43 push-off plate
51 first pressing unit
52 second pressing unit
53 first pressing wheel
54 second pressing wheel
55 sleeve
71 first sensor unit
72 second senor unit
8 control unit
80 drum drive
81 first conveyor drive
82 second conveyor drive
91 first tire component
92 second tire component
D tire building drum
L1 length of the first tire component
L2 length of the second tire component
LE1 leading end of first tire component
LE2 leading end of second tire component
TE1 trailing end of first tire component
TE2 trailing end of second tire component
X supply direction
Y lateral direction
Z pick-and-place direction

The invention claimed is:

1. A dual tire component servicer for supplying a first tire component and a second tire component to a tire building drum, wherein the dual tire component servicer comprises a first conveyor and a second conveyor for conveying the first tire component and the second tire component, respectively, in a supply direction towards the tire building drum, wherein the dual tire component servicer further comprises a first pick-and-place unit and a second pick-and-place unit for transferring the first tire component and the second tire component, respectively, from their respective conveyors to the tire building drum, wherein each pick-and-place unit comprises a gripper head and a retaining element for retaining the respective tire component to the gripper head, wherein the first pick-and-place unit and the second pick-and-place unit are automatically and independently movable relative to each other in a lateral direction perpendicular to the supply direction.

2. The dual tire component servicer according to claim 1, wherein the dual tire component servicer comprises a first lateral drive and a second lateral drive that are individually controllable for driving the movements of the first pick-and-place unit and the second pick-and-place unit, respectively, in the lateral direction.

3. The dual tire component servicer according to claim 1, wherein the first pick-and-place unit and the second pick-and-place unit are synchronously movable in the supply direction.

4. The dual tire component servicer according to claim 1, wherein the dual tire component servicer comprises a supply drive common to the first pick-and-place unit and the second pick-and-place unit for synchronously driving the movements of the first pick-and-place unit and the second pick-and-place unit in the supply direction.

5. The dual tire component servicer according to claim 1, wherein the dual tire component servicer further comprises a first sensor unit upstream of the first pick-and-place unit and the second pick-and-place unit relative to the supply direction for detecting lateral positions of the first tire component and the second tire component on the first conveyor and the second conveyor, respectively.

6. The dual tire component servicer according to claim 5, wherein the dual tire component servicer comprises a first lateral drive and a second lateral drive that are individually controllable for driving the movements of the first pick-and-place unit and the second pick-and-place unit, respectively, in the lateral direction, wherein the dual tire component servicer is provided with a control unit that is operationally connected to the first lateral drive, the second lateral drive and the first sensor unit for controlling the movements of the first pick-and-place unit and the second pick-and-place unit in the lateral direction based on detection signals from the first sensor unit.

7. The dual tire component servicer according to claim 1, wherein the dual tire component servicer further comprises a second sensor unit downstream of the first pick-and-place unit and the second pick-and-place unit relative to the supply direction for detecting lateral positions of the first tire component and the second tire component on the tire building drum.

8. The dual tire component servicer according to claim 7, wherein the dual tire component servicer comprises a first lateral drive and a second lateral drive that are individually controllable for driving the movements of the first pick-and-place unit and the second pick-and-place unit, respectively, in the lateral direction, wherein the dual tire component servicer is provided with a control unit that is operationally connected to the first lateral drive, the second lateral drive and the second sensor unit for controlling the movements of the first pick-and-place unit and the second pick-and-place unit in the lateral direction based on detection signals from the second sensor unit.

9. The dual tire component servicer according to claim 1, wherein the first tire component and the second tire component each have a leading end and a trailing end, wherein the first pick-and-place unit and the second pick-and-place unit are arranged for first transferring the leading end and subsequently transferring the trailing end of the first tire component and the second tire component, respectively, wherein the dual tire component servicer is provided with a control unit that is configured for controlling the movements of the first pick-and-place unit and the second pick-and-place unit in the lateral direction during at least one of the transferring of the leading ends and the transferring of the trailing ends such that lateral positions of each tire component at the leading end and the trailing end are aligned.

10. The dual tire component servicer according to claim 1, wherein the retaining element is a suction element.

11. The dual tire component servicer according to claim 1, wherein each pick-and-place unit further comprises a release member for releasing the respective tire component from the retaining element.

12. The dual tire component servicer according to claim 11, wherein the release member comprises a push-off plate that is movable relative to the retaining element in a pick-and-place direction transverse or perpendicular to the supply direction and the lateral direction.

13. The dual tire component servicer according to claim 12, wherein the push-off plate is movable between a retracted position at the same level as or above the retaining element in the pick-and-place direction and a push-off position below the retaining element in the pick-and-place direction.

14. The dual tire component servicer according to claim 13, wherein the push-off plate extends at least partially around the retaining element when the push-off plate is in the retracted position.

15. The dual tire component servicer according to claim 1, wherein the dual tire component servicer further comprises a first pressing unit and a second pressing unit for pressing the first tire component and the second tire component, respectively, onto the respective conveyors.

16. The dual tire component servicer according to claim 15, wherein the first pressing unit and the second pressing unit are carried by the first pick-and-place unit and the second pick-and-place unit, respectively.

17. The dual tire component servicer according to claim 16, wherein the first pressing unit and the second pressing unit are movable in a pick-and-place direction transverse or perpendicular to the supply direction and the lateral direction relative to the first pick-and-place unit and the second pick-and-place unit, respectively.

18. The dual tire component servicer according to claim 15, wherein each pressing unit comprises a first pressing wheel that is rotatable about a wheel axis parallel to the lateral direction.

19. The dual tire component servicer according to claim 18, wherein the first pressing wheel is a profiled wheel with teeth.

20. The dual tire component servicer according to claim 18, wherein each pressing unit comprises a second pressing wheel coaxial to and spaced apart from the first pressing wheel.

21. The dual tire component servicer according to claim 20, wherein the second pressing wheel is a profiled wheel with teeth.

22. The dual tire component servicer according to claim 1, wherein the first tire component and the second tire component each have a leading end and a trailing end and a length between the respective leading end and the respective trailing end, wherein the dual tire component servicer further comprises at least one of a first sensor unit upstream of the first pick-and-place unit and the second pick-and-place unit relative to the supply direction and a second sensor unit downstream of the first pick-and-place unit relative to the supply direction, wherein the dual tire component servicer is provided with a control unit that is configured for controlling, based on detection signals from the first sensor unit and/or the second sensor unit, a speed ratio between the respective conveyor and the tire building drum to adjust said length for at least one of the tire components.

23. The dual tire component servicer according to claim 1, wherein the tire components are breaker cushions.

24. A dual tire component servicer for supplying a first tire component and a second tire component to a tire building drum, wherein the dual tire component servicer comprises a first conveyor and a second conveyor for conveying the first tire component and the second tire component, respectively, in a supply direction towards the tire building drum, wherein the dual tire component servicer further comprises a first pick-and-place unit and a second pick-and-place unit for transferring the first tire component and the second tire component, respectively, from their respective conveyors to the tire building drum, wherein each pick-and-place unit comprises a gripper head and a retaining element for retaining the respective tire component to the gripper head, wherein the first pick-and-place unit and the second pick-and-place unit are automatically and independently movable relative to each other in a lateral direction perpendicular to the supply direction, and wherein the dual tire component servicer further comprises a second sensor unit downstream of the first pick-and-place unit and the second pick-and-place unit relative to the supply direction for detecting lateral positions of the first tire component and the second tire component on the tire building drum.

25. The dual tire component servicer according to claim 24, wherein the dual tire component servicer comprises a first lateral drive and a second lateral drive that are individually controllable for driving the movements of the first pick-and-place unit and the second pick-and-place unit, respectively, in the lateral direction.

26. The dual tire component servicer according to claim 24, wherein the first pick-and-place unit and the second pick-and-place unit are synchronously movable in the supply direction.

27. The dual tire component servicer according to claim 24, wherein the dual tire component servicer comprises a supply drive common to the first pick-and-place unit and the second pick-and-place unit for synchronously driving the movements of the first pick-and-place unit and the second pick-and-place unit in the supply direction.

28. The dual tire component servicer according to claim 24, wherein the dual tire component servicer further comprises a first sensor unit upstream of the first pick-and-place unit and the second pick-and-place unit relative to the supply direction for detecting lateral positions of the first tire component and the second tire component on the first conveyor and the second conveyor, respectively.

29. The dual tire component servicer according to claim 28, wherein the dual tire component servicer comprises a first lateral drive and a second lateral drive that are individually controllable for driving the movements of the first pick-and-place unit and the second pick-and-place unit, respectively, in the lateral direction, wherein the dual tire component servicer is provided with a control unit that is operationally connected to the first lateral drive, the second lateral drive and the first sensor unit for controlling the movements of the first pick-and-place unit and the second pick-and-place unit in the lateral direction based on detection signals from the first sensor unit.

* * * * *